United States Patent [19]

Küpper et al.

[11] Patent Number: 4,697,692

[45] Date of Patent: Oct. 6, 1987

[54] DEVICE FOR ADVANCING COPS TO A CYCLICALLY STEPWISE ADVANCING COP CONVEYOR

[75] Inventors: Wilhelm Küpper, Wegberg; Helmuth Hensen, Mönchengladbach, both of Fed. Rep. of Germany

[73] Assignee: W. Schlafhorst & Co., Mönchengladbach, Fed. Rep. of Germany

[21] Appl. No.: 805,330

[22] Filed: Dec. 4, 1985

[30] Foreign Application Priority Data

Dec. 7, 1984 [DE] Fed. Rep. of Germany ....... 3444625

[51] Int. Cl.[4] .............................................. B65G 37/00

[52] U.S. Cl. .................................... 198/464.3; 57/274; 57/281; 198/450; 198/531; 198/532; 198/803.12; 242/35.5 A

[58] Field of Search .................. 198/487.1, 464.3, 448, 198/450, 451, 478.2, 531, 532, 803.12; 242/35.5 A; 57/274, 281

[56] References Cited

U.S. PATENT DOCUMENTS

| | | | |
|---|---|---|---|
| 3,698,536 | 10/1972 | Pray et al. | 198/803.12 X |
| 3,998,320 | 12/1976 | Eggert | 198/532 X |
| 4,215,774 | 8/1980 | Manservisi | 198/450 X |
| 4,571,931 | 2/1986 | Kupper | 57/281 |
| 4,586,668 | 5/1986 | Mori | 242/35.5 A |

FOREIGN PATENT DOCUMENTS

| | | | |
|---|---|---|---|
| 1067450 | 5/1967 | United Kingdom | 198/451 |

*Primary Examiner*—Robert J. Spar
*Assistant Examiner*—Jonathan D. Holmes
*Attorney, Agent, or Firm*—Herbert L. Lerner; Laurence A. Greenberg

[57] ABSTRACT

A device for individually and sucessively advancing cops from a cop-producing machine in an orderly manner via conveyor belts to a cyclically stepwise advanceable cop conveyor having take-up mandrels thereon, comprising respective substantially vertical loading shafts located between the conveyor belts and the cop conveyor for delivering cops in upright position onto the take-up mandrels of the cop conveyor, the loading shafts being formed of sidewise deflectable wall elements, an actuating device operatively engageable with the loading shafts, respectively, for deflecting the wall elements thereof sidewise so as to permit the respective delivered cop to be father advanced by the cop conveyor, clock switching devices connected to the conveyor belts for actuating the belts to individually and successively advance the cops in the orderly manner, and a sensor for distinguishing between the absence and presence of a cop on a respective take-up mandrel of the cop conveyor and for enabling and disenabling the clock switching device accordingly.

4 Claims, 4 Drawing Figures

9
8
19
38
28
M
34
24
31
16
44
28
33
17
32
1
43
40
29
21
39
30
4
10
15
22

9
8
10
25
38
19
28
M
44
24
15
16
17
28
32
30
1
43
40
21
39
29
4
31
22

DEVICE FOR ADVANCING COPS TO A CYCLICALLY STEPWISE ADVANCING COP CONVEYOR

The invention relates to a device for advancing cops to a cyclically stepwise advancing cop conveyor and, more particularly, to such a device which individually and successively advances cops from a cop-producing machine in an orderly manner via conveyor belts to such a conveyor which has take-up mandrels thereon.

When the cops are transferred to the cop conveyor, disruptions occur rather easily due to inexact transfer. Thus, cops can rather readily become jammed in a loading shaft, causing failure of the device or even give rise to more extensive disruptions and machine breakdown.

It is accordingly an object of the invention to provide a device for individually and successively advancing cops from a cop-producing machine in an orderly manner via conveyor belts to a cyclically stepwise advanceable cop conveyor having take-up mandrels thereon which will perform its function without any trouble and rapidly.

With the foregoing and other objects in view, there is provided in accordance with the invention, a device for individually and successively advancing cops from a cop-producing machine in an orderly manner via conveyor belts to a cyclically stepwise advanceable cop conveyor having take-up mandrels thereon, comprising respective substantially vertical loading shafts located between the conveyor belts and the cop conveyor for delivering cops in upright position onto the take-up mandrels of the cop conveyor, the loading shafts being formed of sidewise deflectable wall elements, an actuating device operatively engageable with the loading shafts, respectively, for deflecting the wall elements thereof sidewise so as to permit the respective delivered cop to be farther advanced by the cop conveyor, clock switching means connected to the conveyor belts for actuating the belts to individually and successively advance the cops in the orderly manner, and sensor means for distinguishing between the absence and presence of a cop on a respective take-up mandrel of the cop conveyor and for enabling and disenabling the clock switching means accordingly.

The sidewise deflectable wall elements prevent jamming or clamping of a cop in the loading shaft and ensure that the cop will be guided in the loading shaft in such a manner as to be drawn downwardly loosely to the cop conveyor. After the wall elements have been deflected to the side, the cop conveyor which has taken up the cop can travel on because the cop thereon can pass through the loading shaft unhindered as through an open door. Because the wall elements are controllable in synchronism with the cop conveyor, assurance is provided that the cop conveyor will not travel on prematurely until the wall elements of the loading shaft have been deflected toward the side. Due to the fact that the clock switching means of the conveyor belt is enabled or activated by sensor means which distinguish between the absence or presence of a cop on a take-up mandrel of the cop conveyor, it can never happen that a loading shaft will become overloaded.

In accordance with another feature of the invention, the sensor means are operative for distinguishing between absence and presence of a cop on a take-up mandrel located directly beneath the respective loading shaft and for enabling the clock switching means when absence of a cop from the take-up mandrel beneath the loading shaft is so distinguished.

In accordance with a further feature of the invention, the sensor means are operative for distinguishing between absence and presence of a cop on a take-up mandrel located directly beneath the respective loading shaft and for activating the clock switching means to actuate the respective conveyor belt for advancing a cop when absence of a cop from the take-up mandrel beneath the loading shaft is so distinguished.

Because the cop conveyor is thereby advanceable stepwise only when the wall elements have been deflected to the side, it is sufficient for ensuring an undisturbed course of operation by making either the actuating device of the wall elements or the clock switching means of the cop conveyor, respectively, switchable or enabled to be switchable through sensor means which distinguish between the presence or absence of a cop on the take-up mandrel then located directly beneath the loading shaft. It would also not be harmful to make both the actuating device of the wall elements as well as the clock switching means of the cop conveyor, respectively, switchable and enabled to be switchable through the sensor means. The cop conveyor can then advance only if the sensor means determine that a cop is located on the take-up mandrel located directly beneath the loading shaft. If this is the case, assurance is then provided that the cop will not yet be moving in the loading shaft and thus possibly cause a disruption when the cop conveyor is set into action or motion.

Due to the fact that a two-sided cop-producing machine, for example, a ring spinning frame, has two conveyor belts and can have two loading shafts, the device according to the invention is provided with a synchronizing device connected to the loading shafts, respectively via the actuating device, and also connected to the clock switching means and the sensor means for synchronizing movement of the conveyor belts, the cop conveyor and the wall elements of the loading shafts.

The loading shafts operate in synchronism. This does not mean, however, that all operating phases must take place precisely with the same rhythm or cycle. The synchronizing device can be so constructed as to afford each loading shaft an individual operating course which also may be carried out in individually different times. The synchronism is assured, however, by the fact that, in this case, the particular loading shaft which completes its course of operation sooner than the other loading shaft must wait until the other loading shaft has completed its operating course before the particular loading shaft may be actuated again. The operating courses or cycles of both loading shafts are thus started simultaneously but they need not absolutely terminate at the same time. That loading shaft which is the last to terminate its function of transferring the cop then releases the cop conveyor so that it can resume cyclically travelling farther.

In accordance with a concomitant feature of the invention the wall elements of the loading shafts are formed of fingers swingable outwardly to a side of the respective loading shafts. It has been found to be advantageous to provide four fingers as wall elements of the loading shaft, the fingers being swingable or deflectable sidewise out of normally substantially vertical positions.

Other features which are considered as characteristic for the invention are set forth in the appended claims.

Although the invention is illustrated and described herein as embodied in a device for advancing cops to a cyclically stepwise advancing cop conveyor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
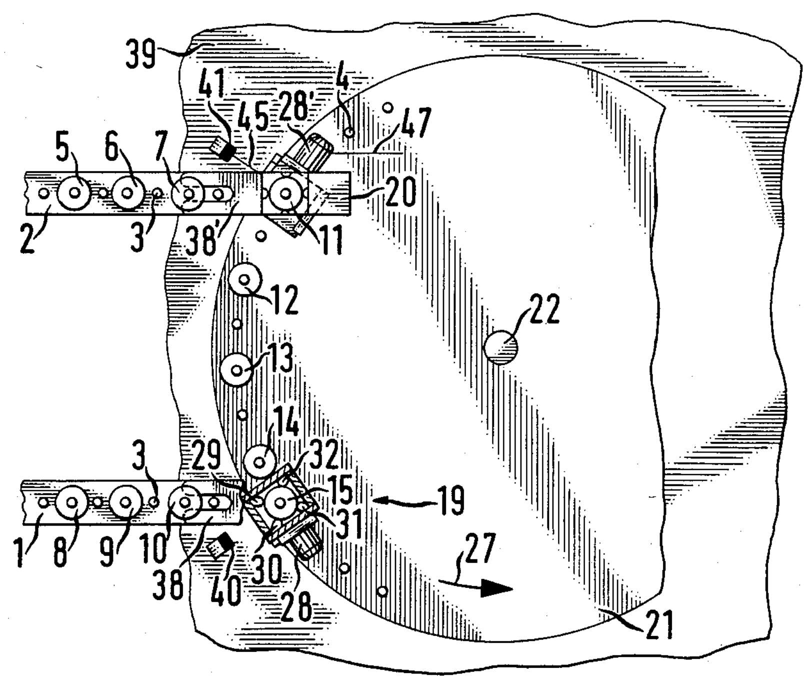
FIG. 1 is a top plan view of a device for farther advancing cops on a cyclically onwardly steppable cop conveyor.

Referring now to the drawing and first, particularly to FIG. 1 thereof, there are shown two conveyor belts, 1 and 2 of an otherwise non-illustrated two-sided ring spinning machine, the conveyor belts 1 and 2 being provided with take-up mandrels 3 for cops 5 to 10. Only every second take-up mandrel 3 is studded with or surmounted by a cop in the conveyor belts 1 and 2.

A loading shaft 19 is located at the end of the conveyor belt 1, and a loading shaft 20 at the end of the conveyor belt 2. Both loading shafts 19 and 20 are of like construction in a mirror-image arrangement.

Both loading shafts serve to advance cops farther directly on a cyclically onwardly steppable cop conveyor 21, which is constructed as a disc-like circular conveyor which is armed at regular intervals at the circumferential edge thereof with vertically extending take-up mandrels 4. The cop conveyor 21 has a central shaft 22 which is cyclically turned by a clock switching mechanism 23 so that the cop conveyor 21, for each switching cycle, moves on for a distance corresponding to double the mean spacing between two mutually adjacent take-up mandrels 4.

The conveyor belts 1 and 2 likewise have clock switching mechanisms. Thus, for example, the conveyor belt 1 has a drive roller 25 which is connected to a clock switching mechanism 24 which turns the drive roller 25, with each switching cycle, through a rotational angle which is so large that the conveyor belt 1 travels farther over a distance equalling double the mean spacing between two adjacent take-up mandrels 3 in direction of the arrow 26.

The loading shafts 19 and 20, respectively, have four members which are movable by an actuating device 28 and constitute wall elements 29 to 32 which are withdrawable or deflectable sidewise. The wall elements 29 to 32 are in the shape of fingers which are swingable laterally and are mutually connected in pairs at the upper ends thereof by respective cross bars 33 and 34. The cross bars 33 and 34 are connected by a bell crank or toggle lever arrangement 35 to the actuating device 28 which is formed, for example, of an electromagnetic drive.

Both loading shafts 19 and 20 have guide rails which engage under the feet of the cops to lift the cops off the conveyor belts 1 and 2. Thus, for example, the loading shaft 19 has a curved and forked guide rail 38, and the loading shaft 20 a guide rail 38'.

Two sensors 40 and 41 are arranged on a plate 39 surrounding the cop conveyor 21. Both sensors 40 and 41 are constructed as light barriers. The sensor 40 is located adjacent the loading shaft 19, the sensor 41 adjacent the loading shaft 20. Each of the two sensors 40 and 41 can distinguish between an empty take-up mandrel 4 and a take-up mandrel 4 which is surmounted by a cop located beneath the respective loading shaft 19 and 20.

Figure 2:
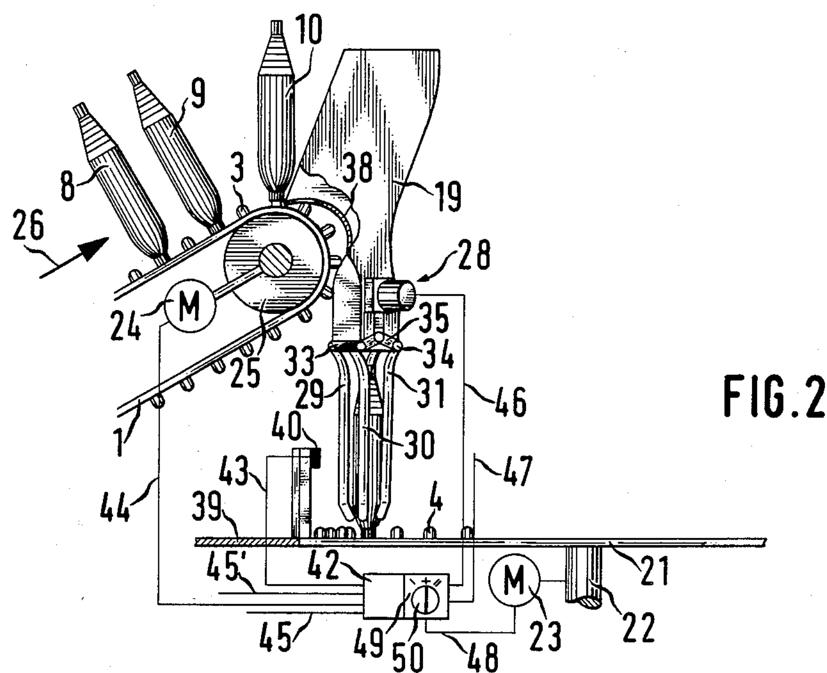
FIG. 2 is a side elevational view of FIG. 1 at an instant wherein the cop conveyor is being charged or supplied with cops.

An operating connection 43, 44 exists from the sensor 40 to the clock switching mechanism 24 via a switching device 42 (FIG. 2). An operating connection 45, 45' from the sensor 41 to the non-illustrated clock switching mechanism of the conveyor belt 2 is also provided via the same switching device 42.

The switching device 42 and a synchronizing device 49 are connected together as an integral structural unit. An operating connection 46 exists between the synchronizing device 49 and the actuating device 28 of the wall element of the loading shaft 19, and an operating connection 47 between the synchronizing device 42 and the actuating device 28' of the wall element of the loading shaft 20. Another operating connecticn 48 exists between the synchronizing device 49 and the clock switching mechanism 23.

An operating connection 43, 46 is provided between the sensor 40 and the actuating device 28 via the switching device 42 and the synchronizing device 49, and an operating connection 45, 47 is provided between the sensor 41 and the actuating device 28' via the switching device 42 and the synchronizing device 49.

The control signals of both sensors 40 and 41 can reach the actuating devices 28 and 28' only via the synchronizing device 49. The synchronizing device 49 ensures that the actuating devices 28 and 28', respectively, are started at the same instant of time and, in fact, when the respectively last of the two sensors 40 and 41 determines the presence of a cop on the take-up mandrel. The finger-like wall elements can then first open in both loading shafts.

The clock switching mechanism 23 of the cop conveyor 21, as aforementioned, is so adjusted that it stepwise advances the cop conveyor, during a switching measure or cycle, a distance corresponding to double the mean spacing between two mutually adjacent take-up mandrels 4 in direction of the arrow 27. Because an even number, namely six, take-up mandrels are disposed between the loading shafts 19 and 20, the loading shaft 20 is in a position to mount cops on each second take-up mandrel 4, for each stepwise controlled movement of the cop conveyor 21 in the direction of the arrow 27. FIG. 1 shows that, for example, the cops 11 to 14 have already been stuck onto the cop conveyor 21 from the loading shaft 20. The take-up mandrels which do not yet carry any cops are then surmounted with cops from the loading shaft 19.

Figure 4:
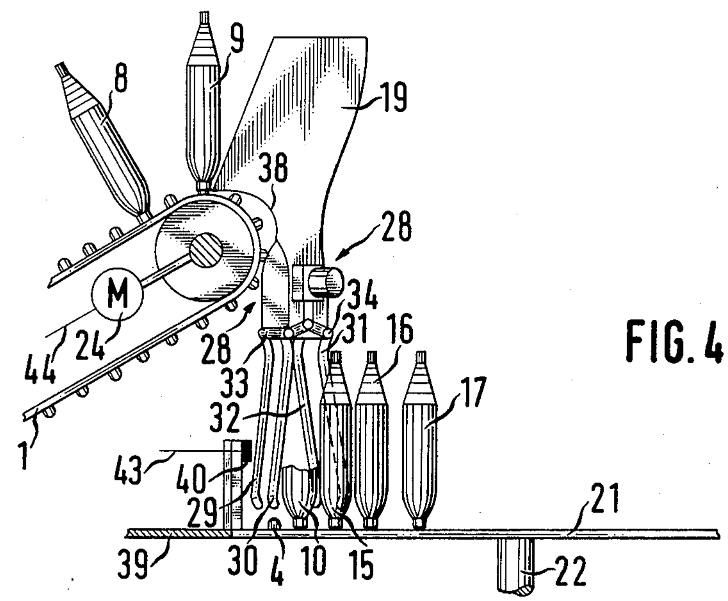
FIGS. 3 and 4 are views similar to that of FIG. 2 of the cop conveyor at other times during the stage wherein it is charged or supplied with cops.
Figure 3:
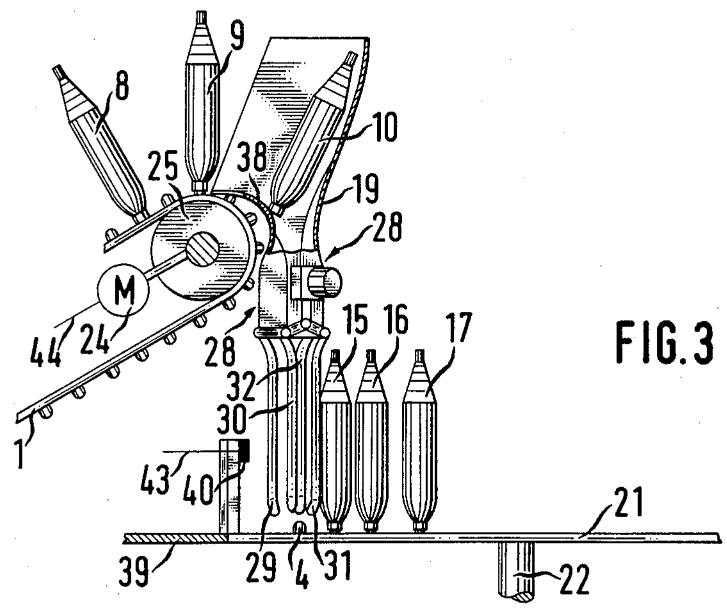

Such a process of mounting cops on the take-up mandrels occurs as follows:

It is assumed that the cop conveyor 12 is already studded or surmounted with the cops 15, 16 and 17. According to FIG. 3, the sensor 40 has, for example, determined that the take-up mandrel 4 just then located under the loading shaft 19 does not carry any cop as yet. The sensor 40 then, via the operative connection 43, the switching device 42 and the operative connection 44, enables the clock switching mechanism 24 to turn the drive roller 25 farther through two divisions of the take-up mandrels, so the cop 10 moves from the position thereof shown in FIG. 2 into the position thereof shown in FIG. 3. During the forward movement, the guide rail 38 engages under the foot of the cop 10 so that the cop foot is released from the respective take-up mandrel, and the cop 10 drops into the loading shaft 19. It is guided by the wall elements 29 to 32 so that the cop sleeve or hollow core is slid over the take-up mandrel 4. After this has occurred, the sensor 40 determines that the cop 10 is then located on the take-up mandrels 4 disposed under the loading shaft 9. It then issues a further signal which initially reaches the switching device 42 via the operating connection 43. The signal continues from the switching device 42 to the synchronizing device 49 and is stored there initially. In the interim, a similar loading operation is performed more-or-less rapidly at the loading shaft 20 until, finally, the sensor 41 thereof likewise transmits a signal via the operating connection 45 to the switching device 42 reporting the presence of a loaded cop. This signal also goes to the synchronizing device 49 which forms an aggregate signal out of both signals which then simultaneously reaches the actuating devices 28 and 28' and the clock switching mechanism 23. Because the two actuating devices 28 and 28' operate somewhat faster than the clock switching mechanism 23, the fingers of both loading shafts open first, as shown in FIG. 4, and then the cop conveyor 21 advances farther through two divisions. The aforedescribed process can then be repeated.

The cop conveyor 21 can then advance the taken-up cops in uninterrupted sequence, for example, to a winding frame. The devices required for this purpose are located on the right-hand side of the cop conveyor 21 which is otherwise not shown in the drawing.

Deviating from the embodiment represented in the figures of the drawing, the device can be readily modified in the circuit details thereof, so that supplying cops is effected via one loading shaft or selectively, in fact, via more than two loading shafts.

Both loading shafts 19 and 20 can, for example, be driven individually. For this purpose, the synchronizing device 49 has a selector switch 50 which, as shown in FIG. 2, is in the Plus setting. In this setting, an aggregate signal is formed out of the signals of the sensors 40 and 41 in the synchronizing device 49, and triggers the actuating devices 28 and 28' and the clock switching mechanism 23. After changing-over the selector switch 50 to the setting I, the synchronizing device 49 is responsive only to the signals of the sensor 40, and when changing-over the selector switch 50 to the setting II only to the signals of the sensor 41. In the first-mentioned case, only the conveyor belt 1 and the loading shaft 19 are in operation, and in the second-mentioned case, the conveyor belt 2 and the loading shaft 20.

In the operating settings I and II, the clock switching mechanism 23, if necessary, can be so programmed that it advances the cop conveyor 21 stepwise only a distance corresponding to that of a single mean spacing between two mutually adjacent take-up mandrels 4, for each switching cycle. Alternatively, a sensor monitoring the wall elements or a microswitch controllable by a wall element may be provided and connected by an operating connection with the clock switching mechanism 23, so as to cause the cop conveyor 21 to be advanceable stepwise only when the wall elements are deflected towards the side.

The foregoing is a description corresponding in substance to German Application No. P 34 44 625.7, dated Dec. 7, 1984, the International priority of which is being claimed for the instant application, and which is hereby made part of this application. Any material discrepancies between the foregoing specification and the aforementioned corresponding German application are to be resolved in favor of the latter.

We claim:

1. Device for individually and successively advancing cops from a cop-producing machine in an orderly manner via two conveyor belts to a cyclically stepwise advanceable cop conveyor having take-up mandrels thereon, comprising respective substantially vertical loading shafts located between the respective conveyor belts and the cop conveyor for delivering cops in upright position onto the take-up mandrels of the cop conveyor, each of said loading shafts being formed of sidewise deflectable wall elements, an actuating device operatively engageable with said loading shafts, respectively, for deflecting said wall elements thereof sidewise so as to permit the respective delivered cop to be further advanced by the cop conveyor, first and second clock switching means connected to the respective conveyor belts for actuating the belts to individually and successively advance the cops in the orderly manner, sensor means for distinguishing between the absence and presence of a cop on a respective take-up mandrel of the cop conveyor and for enabling and disenabling said first and second clock switching means accordingly, and third clock switching means connected to the cop conveyor, said sensor means being operative for distinguishing between absence and presence of a cop on a respective take-up mandrel located directly beneath the respective loading shaft and for enabling said third clock switching means to advance stepwise, during each switching cycle, a distance corresponding to double the mean spacing between two mutually adjacent take-up mandrels of the cop conveyor, when the presence of a cop on each of the respective take-up mandrels beneath both of said loading shafts is distinguished.

2. Device according to claim 1 wherein said sensor means are operative for activating said first and second clock switching means to actuate the respective conveyor belt for advancing a cop when absence of a cop from said take-up mandrel beneath said loading shaft is so distinguished.

3. Device acording to claim 1, including a synchronizing device connected to said loading shafts, respectively via said actuating device, and also connected to said first and second clock switching means and said sensor means for synchronizing movement of the conveyor belts, the cop conveyor and said wall elements of said loading shafts.

4. Device according to claim 1 wherein said wall elements of said loading shafts are formed of fingers swingable outwardly to a side of the respective loading shafts.

* * * * *